3,201,090
ELBOW ADAPTER FOR ELECTRICAL CONDUIT
WIRE PULLER
Milton Earl Jones, 357 Athol Ave., Oakland 6, Calif.
Filed Feb. 6, 1963, Ser. No. 256,680
5 Claims. (Cl. 254—134.3)

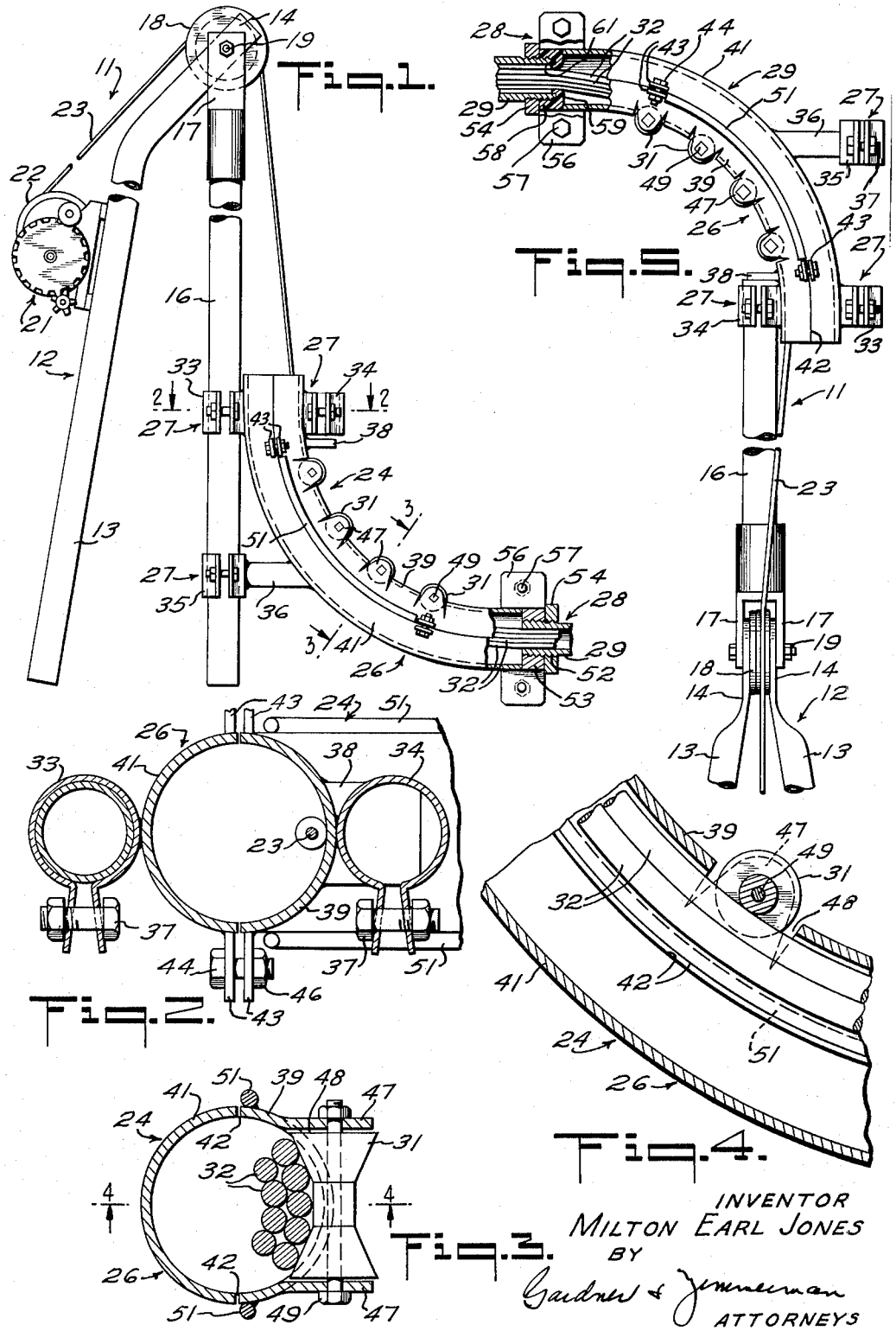

This invention relates to powered mechanism for facilitating the pulling of conductor wire through conduits in a building, and is more particularly directed to an elbow adapter for use with such mechanism to materially increase its versatility in wire pulling applications.

Powered mechanism for pulling conductor wire through conduits, as disclosed in my prior U.S. Patent No. 3,072,382, expedite the pulling of conductors through conduit from a number of required directions. Briefly, such mechanism includes a winch mounted upon a rigid elongated support member and a rigid elongated brace member pivotally secured to an end of the support member. A pulley at the pivot joint and another pulley which is selectively slidable along, and rotatable about the brace member facilitate low friction guidance of a conductor pull cable from a conduit opening to the winch. By virtue of this structural arrangement, the brace may be pivoted to various angular positions relative to the support, and the second pulley variously positioned on the brace to enable the winch to pull the cable upward from a conduit opening in a floor, downward from an overhead opening, or laterally from wall openings inclined at any of various angles. In each instance the free end of the brace is butted against a surrounding wall surface adjacent the conduit opening with the brace substantially parallel to the axis thereof. Thus it will be appreciated that although the puller mechanism is suitable for pulling conductors from conduit openings in a number of diverse locations and having a variety of orientations, there do exist certain other conduit installations for which the puller mechanism cannot be set up to exert pull in the required direction to draw the conductors through the conduit. For example, where a conduit has an end elbow protruding from a floor, the axis of the conduit opening being thereby parallel to and very closely adjacent the floor, the puller mechanism cannot be made to assume a configuration that is commensurate with the exertion of a pull in substantial alignment with the axis of the conduit opening. Moreover, in some instances conduit openings are located in confined areas which, because of their relatively small dimensions, preclude the setting up of the puller in the usual configuration required to pull conductors through the conduit. For example, assume that a conduit opening is located in a first wall and a second parallel wall is relatively closely spaced from the first wall to define a narrow compartment therebetween. To pull conductors from this conduit opening, the puller mechanism would normally be setup with the brace abutting the first wall adjacent the conduit opening and parallel to the axis thereof. In other words, the brace would be disposed substantially transversely between the two walls. However, by virtue of the narrowness of the compartment between the walls, this disposition of the brace may be precluded.

In view of the foregoing it will be appreciated that advantages are to be gained where adapter means are provided for employment with conduit wire puller mechanism of the type disclosed in my hereinbefore referenced Patent No. 3,072,382 to selectively facilitate the exertion of pulls in directions substantially normal to the axis of the brace member, in addition to the existing exertion of pull parallel to the brace member axis. Then, in the previously noted example where a conduit elbow protrudes from a floor, the puller mechanism can be setup with the brace abutting the floor in perpendicular relation thereto. The adapter means can then be employed to pull conductors in a direction normal to the brace and hence coaxially through the conduit opening. Similarly, in the other specific example noted hereinbefore, the puller mechanism can be setup with the brace parallel to the two walls and abutting a third wall at the end of the compartment, for example. The adapter means then facilitates pulling of conductors through the conduit with pull exerted coaxially of its opening. The adapter means likewise converts the puller mechanism to use in many other applications heretofore precluded and accordingly materially adds to the versatility of the mechanism.

Therefore, it is an object of the present invention to provide an adapter for use with a conduit wire puller of the type outlined hereinbefore to selectively convert the direction of pull from a direction substantially parallel to the brace member thereof to directions normal thereto.

Another object of the invention is the provision of an adapter of the class described in the form of a 90° guide below arranged at one end for selectively slidable and rotatable securance to the brace member of the wire puller to smoothly guide its pull cable, and conduit conductors secured thereto, through a transition from a direction parallel to the brace member to directions normal thereto.

It is still another object of the invention to provide an adapter elbow of the class described wherein rollers are provided along the smaller radius of curvature of the elbow journalled for rotation transversely thereof and in communication with the elbow interior to facilitate low friction guidance of the pull cable and conduit conductors therethrough.

It is yet another object of the invention to provide an adapter elbow of the class described having provision at its free end for selective communicable coaxial connection to conduits of varied diameters.

A further object of the invention is the provision of an adapter elbow of the class described which is relatively simple and economical in manufacture.

The invention possesses other objects and features of advantage, some of which, with the foregoing, will be set forth in the following description of the preferred form of the invention which is illustrated in the drawing accompanying and forming part of the specification. It is to be understood, however, that variations in the showing made by the said drawing and description may be adopted within the scope of the invention as set forth in the claims.

FIGURE 1 is a side elevation of an electrical conduit wire puller having an adapter in accordance with the present invention associated therewith to facilitate the exertion of pull in a given direction normal to the brace member of the puller, a portion of the adapter being broken away and shown in section to illustrate the means employed to couple the adapter to a conduit.

FIGURE 2 is a sectional view taken at line 2—2 of FIGURE 1, particularly illustrating coupling means of the adapter for facilitating its securance to the wire puller brace member in varied longitudinal and angular relations thereto.

FIGURE 3 is a sectional view taken at line 3—3 of FIGURE 1, illustrating the roller spools thereof and a unique manner of mounting same.

FIGURE 4 is a sectional view taken at line 4—4 of FIGURE 3.

FIGURE 5 is a plan view of the electrical conduit wire puller setup in a different manner than that depicted in FIGURE 1, and with the adapter mounted to facilitate the exertion of pull in a different direction normal to the brace member of the puller, a portion of the adapter being broken away and shown in section to illustrate a modified form of coupling means connecting the adapter to a conduit.

Referring now to FIGURE 1, 11 generally designates an electrical conduit wire puller of the type disclosed by my prior Patent No. 3,072,382. Basically, the puller includes a substantially triangular winch support frame 12 formed by side members 13 spaced apart at one end to define legs which generally converge at the opposite end and terminate in closely spaced parallel clevis arms 14. The puller further includes an elongated brace member 16 having a second pair of parallel spaced apart clevis arms 17 at one end in exterior engagement with the clevis arms 14. A pulley 18 is disposed between the clevis arms 14, and a threaded bolt 19 extends transversely through the arms 14 and 17, and through the pulley to thus journal the pulley as well as form a pivot axle connecting the brace to the frame. By tightening a nut threaded upon the end of bolt 19, the brace may be locked in any angular position relative to the frame. A winch unit 21, preferably of the power driven class, is mounted upon the frame 12. Such unit includes a rotatable drum 22 upon which a flexible pull cable 23 is wound. The cable 23 is threaded about pulley 18 to thus be guided substantially parallel to the brace member 16, in any of its locked angular positions, to a conduit opening in a surface against which the brace is abutted. The cable may hence be secured to conductors which are to be pulled through the conduit, and upon actuation of the winch unit the cable exerts a pull on the conductors in a direction substantially parallel to the brace.

As noted hereinbefore, in some applications of the wire puller 11, it is necessary that the cable 23 exert pull in directions normal to the brace member 16. To this end, an adapter 24, in accordance with the present invention, is provided which is arranged for securance to the brace member to smoothly guide the pull cable through a transition from a direction parallel to the brace member to directions normal thereto. The securance means of the adapter enables the adapter to be secured at varied longitudinal and angular positions of the brace whereby any one of a number of different wire pulling directions normal to the brace may be readily selected. More particularly, the adapter 24 generally comprises a tubular 90° elbow 26 having clamp means, as generally indicated by the numeral 27, at one end for clamped connection of this first end of the elbow to the brace member 16 of the puller in parallel adjacent relation thereto. The other end of the elbow of course then projects from the brace member in normal relation thereto. This latter end of the elbow is preferably provided with coupling means 28 to facilitate coaxial communicable connection to a conduit as shown at 29. Along the inner radius of curvature of the elbow there are provided a plurality of rollers 31 journalled transversely thereto and communicating with the interior of the elbow. These rollers provide a low friction bearing surface for guiding the pull cable 23, and conduit conductors 32 secured thereto, through the elbow. Thus the adapter elbow converts the usual direction of pull on the cable 23, parallel to the brace member, to pull in a direction normal thereto and coaxially of the opening of conduit 29, by providing a smoothly guided transition between such directions.

Considering now the adapter 24 in greater detail as to preferred structure, it is first to be noted that the clamp means 27 advantageously comprises a pair of split ring clamps 33, 34 respectively secured in diametric opposition to the outer and inner radii of curvature peripheral portions of the elbow adjacent the first end thereof. A third split ring clamp 35 is secured as by means of a bracket 36 to the outer radius of curvature peripheral portion in coaxial spaced relation to clamp. All clamps 33, 34, 35 are provided with bolts 37 extending through adjacent segments of their split rings to facilitate adjustable clamping of same tightly about a tubular member in the conventional manner. In addition a stop plate 38, or equivalent stop means is provided projecting from the inner radius of curvature peripheral portion of the elbow adjacent the inner end of clamp 34 to thus abut the end of a tubular member inserted therethrough. Hence, clamps 33, 35 may be concentrically engaged upon brace member 16, as depicted in FIGURE 1, and slid to any desired longitudinal position thereof. Likewise the clamps may be moved concentrically about the brace member to varied angular positions thereof. The clamps may be tightened in any of these positions by means of their associated bolts 37 to thus lock the elbow upon the brace member. Where it is desired that the elbow is secured to the end of the brace member, as depicted in FIGURE 5, the clamp 34 is employed in a similar manner, additional support in such end attachment being provided by the stop plate 38.

With regard to the structural details of the elbow 26, same is preferably formed in two halves, namely an inner arcuate half 39 and an outer arcuate half 41, both of semicircular cross section, engaging each other in diametrically opposed relation along central arcuate cleavage lines 42. The elbow halves 39, 41 are then preferably provided with sets of radially projecting lugs 43 disposed along their opposite edges, with the sets of lugs associated with one half being aligned with the lugs associated with the other half. Bolts 44 extending through aligned sets of lugs and receiving nuts 46 facilitate securance of the halves together. Other means may of course be alternatively employed to secure the lebow halves together.

It should be noted that the provision of the elbow in two halves facilitates journalled mounting of the roller spools 31 in communication with the elbow interior in a manner adapted to simple manufacturing techniques. More particularly, the inner elbow half 39 is provided with a plurality of arcuately spaced sets of transversely spaced ears 47 on opposite sides of transversely extending slots 48 through the periphery of the elbow half. These ears and slots are readily formed in a single operation by means of punch dies brought into engagement with the inner periphery of the elbow half to punch out the ears and bend them oppositely transversely outward, thus at the same time forming the slots. The spools 31 are then transversely disposed within the slots 48 between the ears 47 of the respective sets thereof. Bolts 49 extending through the ears and axially through the spools, then serve as axles therefor. Inasmuch as the slots 48 may somewhat weaken the elbow half 39, reenforcing rods 51 may be advantageously welded, to the outer periphery thereof adjacent its arcuate edges.

Considering now the coupling means 28 for coaxially connecting the second end of the adapter 24 to a conduit 29, it is first to be noted that the ends of conduit are typically externally threaded as indicated at 52. In addition, conduit is available in a number of different diameter sizes. Accordingly in order to accommodate conduit of varied sizes the coupling means 28 preferably includes a reducing ring 53 selected from a graded set thereof. All rings of the set have an outer diameter equal to the outer diameter of the elbow 26, but respectively have internally threaded inner diameters which are graded to accommodate the various sizes of conduit which may be encountered. The coupling means further includes a lock nut 54 and a split ring coupling 56 adapted to concentrically engage the peripheries of the elbow and the ring 53. Thus to couple the second end of the elbow to the conduit 29, the lock nut 54 is first engaged upon the threaded end 52 of the conduit as depicted in FIGURE 1. The appropriate reducing ring 53 is likewise threaded upon the end of the conduit. The end of the elbow is abutted against the end face of the ring 53. The coupling 56 is concentrically engaged about the elbow and ring in bridging relation thereto, and the bolts 57 of the coupling are tightened to thus complete the connection of the elbow to the conduit.

The reducing rings 53 of the coupling means 28 may be advantageously modified as depicted in FIGURE 5. As shown therein the modified reducing ring 58 is fabricated from plastic or equivalent material. The ring is still one of a set of rings of the same outer diameter equal to that of the elbow, but having graded inner diameters for threaded engagement with conduits of different sizes. However, each ring 58 is provided with an inwardly flared flange 59 at its outer end. The inner face of the flange has an annular groove 61 to receive the annular end face of conduit having a size to be accommodated by the particular ring. Thus the end face of the conduit is covered by the flange 59. Inasmuch as the ring is of plastic, the flange hence presents a smooth, low friction surface to the conductors 32 being pulled through the conduit and minimizes abrasion thereof.

What is claimed is:

1. An adapter comprising a tubular 90° elbow formed of inner and outer arcuately extending half portions of semi-circular cross section, said half portions secured in diametrically opposed relation along arcuate cleavage lines, a plurality of arcuately spaced pairs of transversely spaced ears integral with and projecting radially outward from said inner half portion, each pair of said ears defining transverse slots therebetween in said inner half portion, a plurality of spools disposed in said slots and journalled transversely between the ears of the respective pairs thereof, a pair of split ring clamps respectively secured in diametric opposition to said inner and outer half portions adjacent a first end of said elbow, said clamps having axes parallel to the axis of said elbow at said first end thereof, a third split ring clamp secured to said outer portion in coaxial spaced relation to said first clamp, a stop plate projecting from said outer portion in inwardly adjacent aligned relation to said second clamp, and means at the second end of said elbow for coupling said second end in coaxial communication with a conduit.

2. An adapter according to claim 1, further defined by said means for coupling and second end of said elbow in coaxial communication with a conduit comprising a reducing ring having an outer diameter equal to that of said elbow, said ring having a threaded internal bore surface adapted to threadably engage a conduit, and clamp means for concentrically engaging the outer peripheries of said ring and second end of said elbow in bridging relation therebetween.

3. An adapter according to claim 1, further defined by said means for coupling said second end of said elbow in coaxial communication with a conduit comprising a reducing ring of plastic material having an outer diameter equal to that of said elbow, said ring having a threaded internal bore surface adapted to threadably engage a conduit, said ring having an inwardly flared flange at one end with an annular groove in its inner face terminating said threaded internal bore surface, and clamp means for concentrically engaging the outer peripheries of said ring and second end of said elbow in bridging relation therebetween.

4. An adapter for an electrical wire puller of the type including an elongated brace pivotally connected to a winch supporting frame and having a pulley at the pivot for guiding a pull cable coupled to the winch along a path parallel to the brace, comprising a tubular 90° elbow, means carried at a first end of said elbow for securance of said first end in parallel relation to said brace at selectable longitudinal and angular positions thereof, means carried at the second end of said elbow for coupling said second end in coaxial communication with a conduit, roller means carried within said elbow adjacent the inner radius of curvature thereof for guiding said pull cable between the first and second ends thereof, said means for securance of said first end in parallel relation to said brace comprising a clamp secured to the outer radius of curvature peripheral portion of said elbow adjacent said first end thereof, and a second clamp secured to the outer radius of curvature peripheral portion of said elbow in coaxially spaced relation to said first clamp, said first and second clamps each concentrically engageable about said brace.

5. An adapter for an electrical wire puller of the type including an elongated brace pivotally connected to a winch supporting frame and having a pulley at the pivot for guiding a pull cable coupled to the winch along a path parallel to the brace, comprising a tubular 90° elbow, means carried at a first end of said elbow for securance of said first end in parallel relation to said brace at selectable longitudinal and angular positions thereof, means carried at the second end of said elbow for coupling said second end in coaxial communication with a conduit, roller means carried within said elbow adjacent the inner radius of curvature thereof for guiding said pull cable between the first and second ends thereof, said roller means comprising a plurality of rollers journalled transversely to the inner radius of curvature peripheral portion of said elbow at arcuately spaced positions therealong and in communication with the interior of said elbow, said elbow being formed of inner and outer arcuately extending half portions of semi-circular cross section, said half portions secured in diametrically opposed relation along arcuate cleavage lines, a plurality of arcuately spaced pairs of transversely spaced ears integral with and projecting radially outward from said inner half portion, each pair of said ears defining transverse slots therebetween in said inner half portion, and said rollers being spools disposed in said slot and journalled transversely between the ears of the respective pairs thereof.

References Cited by the Examiner
UNITED STATES PATENTS

| | | | |
|---|---|---|---|
| 1,514,612 | 11/24 | Glasgow | 254—134.3 |
| 2,286,781 | 6/42 | Abramson et al. | |
| 2,515,724 | 7/50 | McCroskey | 254—134.3 |
| 2,718,376 | 9/55 | Raney. | |
| 3,072,382 | 1/63 | Jones | 254—134.3 |

WILLIAM FELDMAN, *Primary Examiner.*

MILTON S. MEHR, *Examiner.*